(12) United States Patent
Chen et al.

(10) Patent No.: US 11,644,908 B2
(45) Date of Patent: May 9, 2023

(54) STYLUS

(71) Applicant: Chicony Electronics Co., Ltd., New Taipei (TW)

(72) Inventors: Chih-Feng Chen, New Taipei (TW); Chien-Shuo Chen, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 44 days.

(21) Appl. No.: 17/472,675

(22) Filed: Sep. 12, 2021

(65) Prior Publication Data

US 2022/0326790 A1   Oct. 13, 2022

(30) Foreign Application Priority Data

Apr. 13, 2021   (TW) ................... 110113279

(51) Int. Cl.
*G06F 3/0354*   (2013.01)
*H02J 50/40*    (2016.01)
*H02J 50/10*    (2016.01)

(52) U.S. Cl.
CPC .......... *G06F 3/03545* (2013.01); *H02J 50/10* (2016.02); *H02J 50/40* (2016.02)

(58) Field of Classification Search
CPC ......... G06F 3/03545; G06F 2200/1632; G06F 1/1607; G06F 1/1656; H02J 50/10; H02J 5/005; H02J 7/025; H02J 50/40; H02J 50/402; H02J 7/00; H01F 7/0252
See application file for complete search history.

(56) References Cited

U.S. PATENT DOCUMENTS

2019/0103764 A1* 4/2019 Marshall ............... G06F 1/1698

FOREIGN PATENT DOCUMENTS

| TW | M517859    | 2/2016  |
| TW | 201916541  | 4/2019  |
| TW | M580210    | 7/2019  |
| TW | 201947367  | 12/2019 |
| TW | I683241    | 1/2020  |

OTHER PUBLICATIONS

"Office Action of Taiwan Counterpart Application", dated Feb. 14, 2022, p. 1-p. 6.

* cited by examiner

*Primary Examiner* — Temesghen Ghebretinsae
*Assistant Examiner* — Ivelisse Martinez Quiles
(74) *Attorney, Agent, or Firm* — JCIPRNET

(57) ABSTRACT

A stylus including a pen body and a magnetic attraction assembly is provided. The magnetic attraction assembly includes a magnet and a magnetic conductive structure. The magnet is disposed at a first position in the pen body. The magnetic conductive structure is disposed in the pen body and connected to the magnet to be magnetized by the magnet, and two end portions of the magnetic conductive structure are respectively located at a second position and a third position in the pen body. The magnetic attraction assembly is adapted to magnetically attract an electronic device at two of the first position, the second position and the third position.

13 Claims, 4 Drawing Sheets

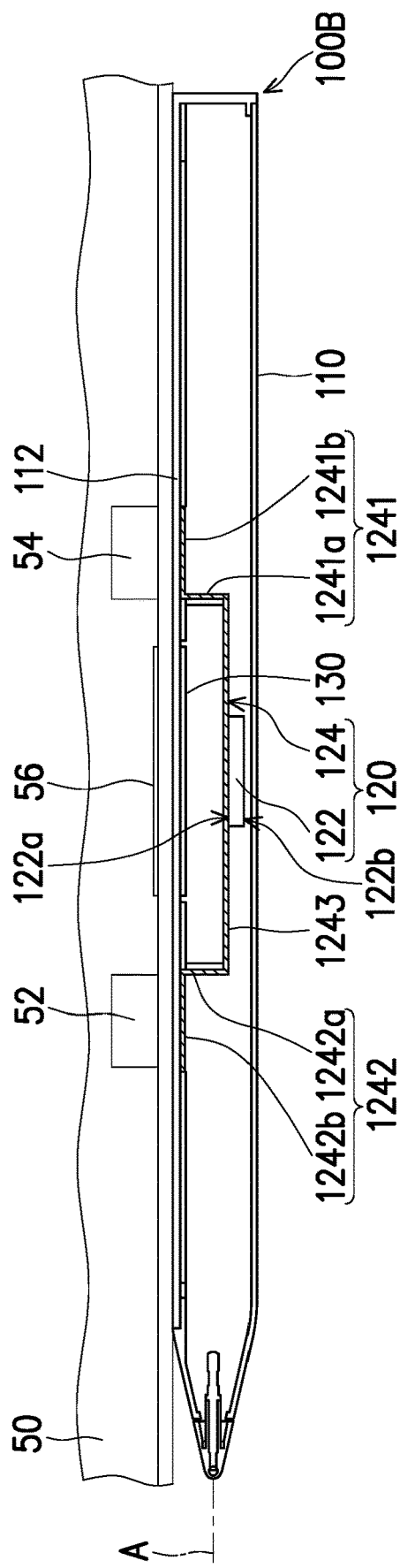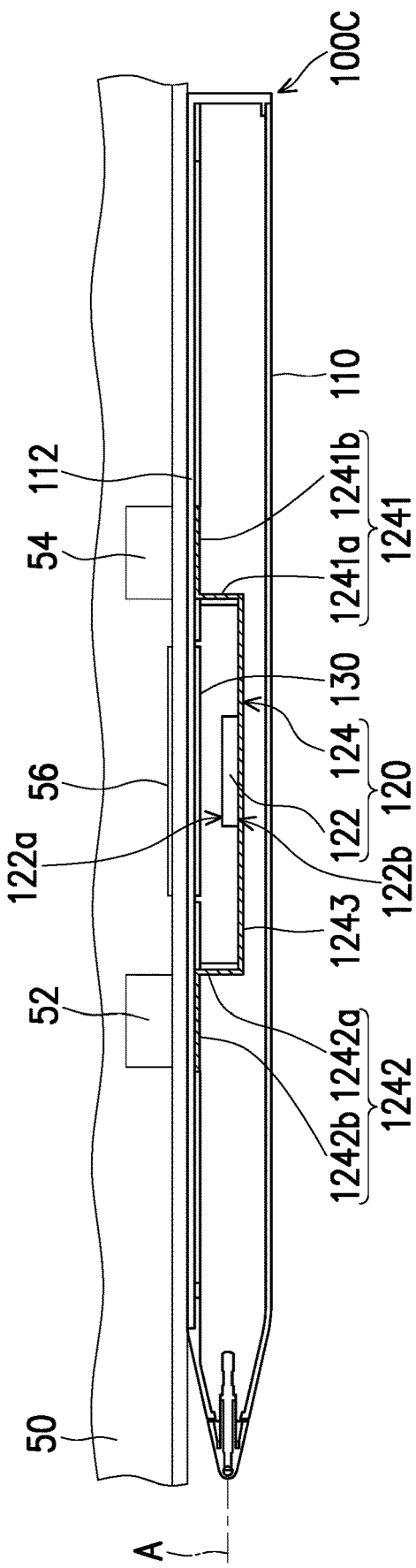

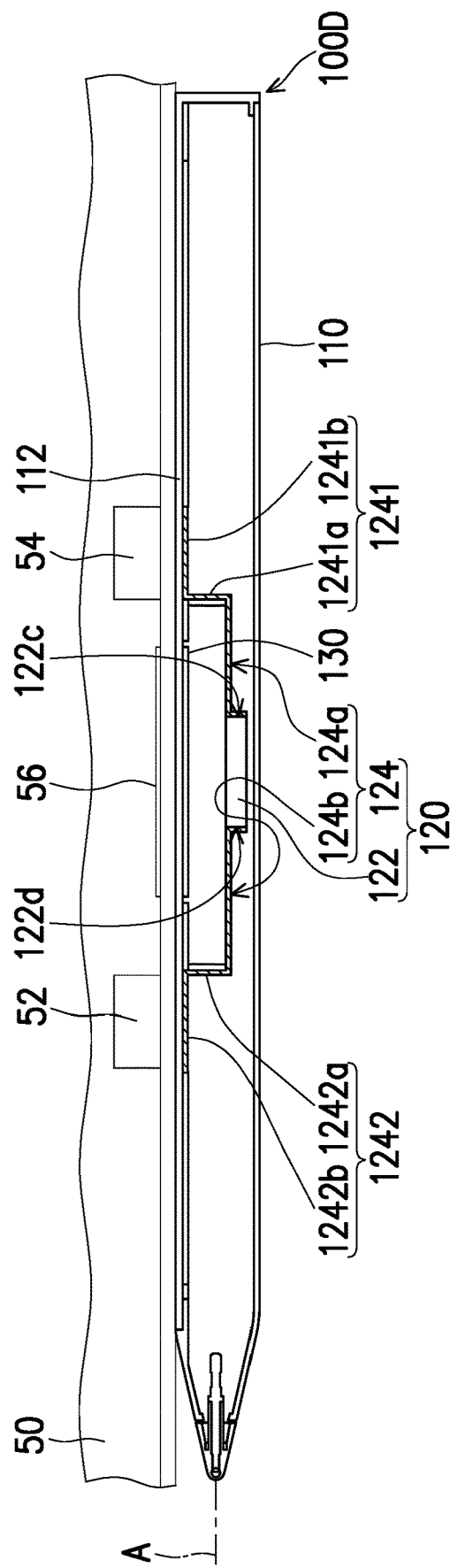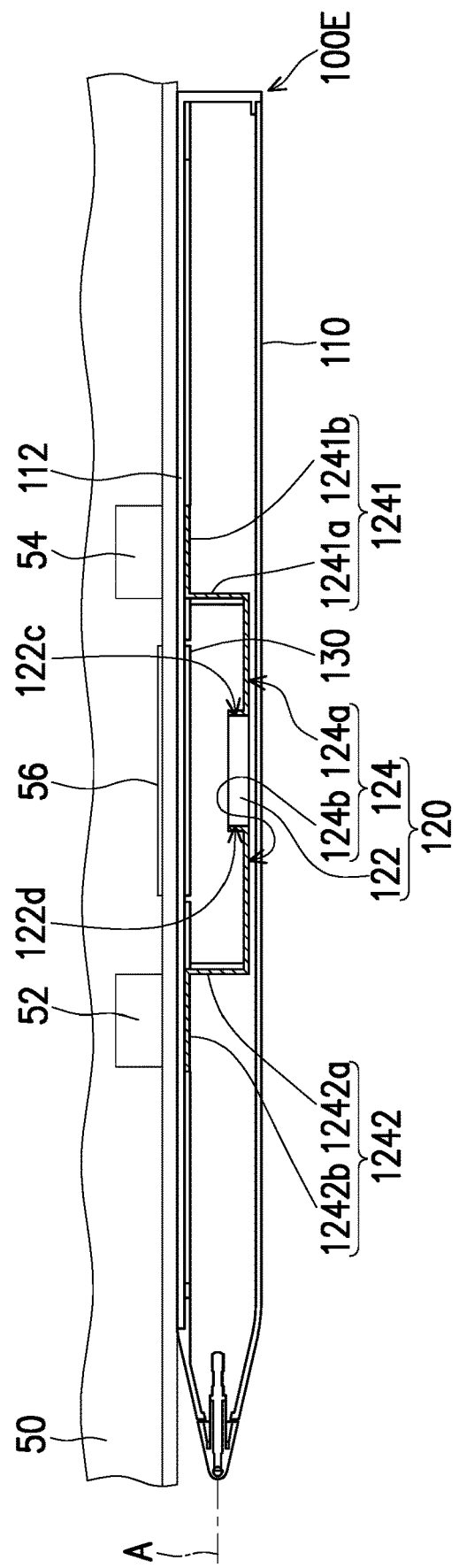

STYLUS

CROSS-REFERENCE TO RELATED APPLICATION

This application claims the priority benefit of Taiwan application serial no. 110113279, filed on Apr. 13, 2021. The entirety of the above-mentioned patent application is hereby incorporated by reference herein and made a part of this specification.

BACKGROUND

Technical Field

The disclosure generally relates to a stylus, in particular, to a stylus which can magnetically attract an electronic device.

Description of Related Art

As touchscreen technology advances, many electronic devices can be used with a stylus to input information. Take a tablet as an example, to store a stylus or combine a stylus with a device when it is not used, some tablets are designed to enable a stylus to be combined on the sides of a tablet with magnetic attraction. Furthermore, to enable a stylus to be combined with a tablet at a predetermined position and angle, multiple magnets are required to be disposed in a stylus to position the stylus with a method of multi-point magnetic attraction. However, multiple magnets which are disposed in a stylus cause a manufacturing cost and the weight of a stylus to increase, and too many magnets occupy the disposition space inside a stylus. In addition, the more magnets are disposed in a stylus, the more easily the antenna efficiency of a charging coil in the stylus tend to decrease because of being affected by a magnetic field.

SUMMARY

Accordingly, the disclosure is directed to a stylus, which, with a single magnet disposed, can magnetically attract an electronic device at a predetermined position and angle.

A stylus in the disclosure includes a pen body and a magnetic attraction assembly. A magnetic attraction assembly includes a magnet and a magnetic conductive structure. The magnet is disposed at a first position in the pen body. The magnetic conductive structure is disposed in the pen body and is connected to the magnet to be magnetized by the magnet, and two end portions of the magnetic conductive structure are respectively located at a second position and a third position in the pen body. The magnetic attraction assembly is adapted to magnetically attract an electronic device at two of the first position, the second position and the third position.

In an embodiment of the disclosure, the pen body includes a side wall, and the side wall is adapted to magnetically attract an electronic device and is attached closely to an electronic device through the magnetic attraction of the magnetic attraction assembly to the electronic device. The distance between two of the first position, the second position and the third position and the side wall is smaller than the distance between the other of the first position, the second position and the third position and the side wall.

In an embodiment of the disclosure, the magnetic conductive structure is connected to the magnet through one of the end portions.

In an embodiment of the disclosure, the pen body includes a side wall, and the side wall is adapted to be attached closely to an electronic device through the magnetic attraction of the magnetic attraction assembly to the electronic device. The magnet is located between one of the end portions and the side wall, and the magnetic attraction assembly is adapted to magnetically attract the electronic device through the magnet and the other of the end portions.

In an embodiment of the disclosure, the pen body includes a side wall, and the side wall is adapted to be attached closely to an electronic device through the mutual magnetic attraction of the magnetic attraction assembly and the electronic device. One of the two end portions is located between the magnet and the side wall. The magnetic attraction assembly is adapted to magnetically attract the electronic device through the two end portions.

In an embodiment of the disclosure, the magnetic conductive structure includes a connection section, and the connection section is connected between the two end portions. The magnetic conductive structure is connected to the magnet through the connection section, and the magnetic attraction assembly is adapted to magnetically attract an electronic device through the two end portions.

In an embodiment of the disclosure, the pen body includes a side wall. The side wall is adapted to be attached closely to an electronic device through the magnetic attraction of the magnetic attraction assembly to the electronic device. The magnet is located between the connection section and the side wall.

In an embodiment of the disclosure, the pen body includes a side wall. The side wall is adapted to be attached closely to an electronic device through the magnetic attraction of the magnetic attraction assembly to the electronic device. The connection section is located between the magnet and the side wall.

In an embodiment of the disclosure, the magnetic conductive structure includes two magnetic conductive elements which are separated from each other. Each of the magnetic conductive elements is connected to the magnet, and the two end portions are located at the two magnetic conductive elements. The magnetic attraction assembly is adapted to magnetically attract an electronic device through the two end portions.

In an embodiment of the disclosure, the two magnetic conductive elements are respectively connected to the two ends of the magnet which are opposite to each other, and the two ends of the magnet are opposite to each other in the direction parallel to the side wall or in the direction perpendicular to the side wall.

In an embodiment of the disclosure, the magnetic conductive structure includes a connection section, and the connection section is connected between the two end portions. At least one of the end portions includes a first extension section and a second extension section. The first extension section is vertically connected to the connection section, and the second extension section is vertically connected to the first extension section and is attached closely to a side wall of the pen body.

In an embodiment of the disclosure, the stylus further includes a functional element. The functional element is disposed in the pen body, and the functional element corresponds to a functional element of an electronic device when the magnetic attraction assembly attracts the electronic device.

In an embodiment of the disclosure, the functional element is disposed at a fourth position in the pen body. Two of the first position, the second position and the third position and the fourth position are arranged along an axial direction of the pen body.

In an embodiment of the disclosure, the two functional elements are charging coils.

As stated above, a magnet is disposed in a stylus in the disclosure, and a magnetic conductive structure which can be magnetized by the magnet is also disposed in the stylus. Also, an end portion of the magnetic conductive structure extends to a position which is different from the position of the magnet. Accordingly, the stylus can be positioned with a method of multi-point magnetic attraction through the single magnet and the end portion of the magnetic conductive structure which is magnetized or a plurality of end portions of a magnetic conductive structure which are magnetized. Therefore, a stylus in this disclosure, with a single magnet disposed, can magnetically attract an electronic device at a predetermined position and angle.

BRIEF DESCRIPTION OF THE DRAWINGS

FIG. 3 is a schematic sectional view of a stylus in still another embodiment of the disclosure.

FIG. 4 is a schematic sectional view of a stylus in yet another embodiment of the disclosure.

FIG. 5 is a schematic sectional view of a stylus in still another embodiment of the disclosure.

FIG. 6 is a schematic sectional view of a stylus in yet another embodiment of the disclosure.

DESCRIPTION OF THE EMBODIMENTS

Figure 1:
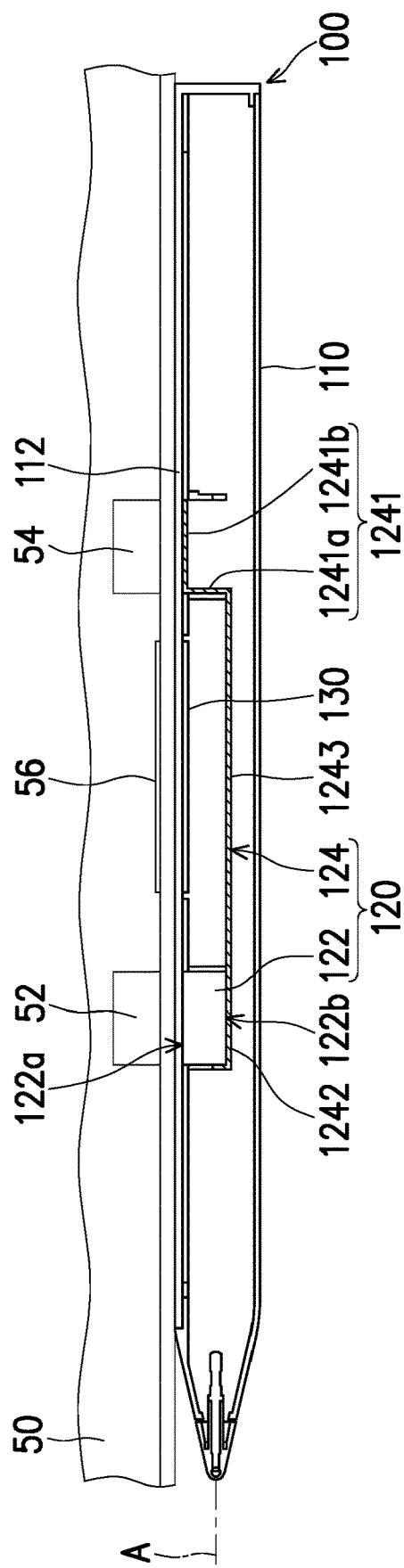
FIG. 1 is a schematic sectional view of a stylus in an embodiment of the disclosure.

FIG. 1 is a schematic sectional view of a stylus in an embodiment of the disclosure. Refer to FIG. 1, a stylus 100 in the embodiment includes a pen body 110 and a magnetic attraction assembly 120. The magnetic attraction assembly 120 includes a magnet 122 and a magnetic conductive structure 124. The magnet 122 is disposed at a first position in the pen body 110. The magnetic conductive structure 124 is disposed in the pen body 110 and includes two end portions 1241 and 1242 and a connection section 1243. The connection section 1243 is connected between the two end portions 1241 and 1242, and the two end portions 1241 and 1242 are respectively located at a second position and a third position in the pen body 110. The magnetic conductive structure 124 is magnetized by the magnet 122 which is connected to the end portion 1242 of the magnetic conductive structure 124.

Furthermore, the pen body 110 includes a side wall 112. The magnet 122 is located between the end portion 1242 and the side wall 112, and the magnet 122 and the end portion 1241 of the magnetic conductive structure 124 are attached closely to the side wall 112. As a result, the distance between the first position where the magnet 122 is located and the side wall 112 and the distance between the second position where the end portion 1241 of the magnetic conductive structure 124 is located and the side wall 112 are respectively smaller than the distance between the third position where the end portion 1242 of the magnetic conductive structure 124 is located and the side wall 112. In other words, the magnet 122 and the end portion 1241 of the magnetic conductive structure 124 are located closer to the side wall 112. Therefore, the magnetic attraction assembly 120 is adapted to magnetically attract a corresponding magnet 52 and a corresponding magnet 54 in an electronic device 50 (for example, a tablet) through, respectively, the magnet 122 and the end portion 1241 of the magnetic conductive structure 124 at the first position and the second position. Accordingly, the side wall 112 of the pen body 110 can be attached closely to the electronic device 50. In this embodiment, a magnetic pole 122a of the magnet 122 which faces the side wall 112 is, for example, a south pole, and the other magnetic pole 122b of the magnet 122 is, for example, a north pole and is connected to the end portion 1242 of the magnetic conductive structure 124. Therefore, the end portion 1241 of the magnetic conductive structure 124 is magnetized into a north pole by the magnet 122. Correspondingly, in the electronic device 50, the magnet 52 faces the outside of the electronic device 50 with a north pole, and the magnet 54 faces the outside of the electronic device 50 with a south pole. Accordingly, the magnet 52 and the magnet 54 are able to, respectively, mutually magnetically attract the magnet 122 and the end portion 1241 of the magnetic conductive structure 124. However, the disclosure is not limited thereto. The magnetic poles of the magnet 122 may be disposed opposite to the above-mentioned, and the magnetic poles of the magnetic conductive structure 124, the magnet 52 and the magnet 54 are accordingly opposite to the above-mentioned.

As stated above, the magnet 122 is disposed in the stylus 100 in this embodiment, and the magnetic conductive structure 124 which is magnetized by the magnet 122 is also disposed in the stylus 100. Furthermore, the end portion 1241 of the magnetic conductive structure 124 extends to a position which is different from the position of the magnet 122. Accordingly, the stylus 100 can be positioned with a method of multi-point magnetic attraction through the single magnet 122 and the end portion 1241 of the magnetic conductive structure 124 which is magnetized. Therefore, the stylus 100 in this embodiment, with the single magnet 122 disposed, can magnetically attract the electronic device 50 at a predetermined position and angle. Furthermore, an increase in a manufacturing cost and the weight of a stylus due to a plurality of magnets which are disposed is prevented. The occupation of the disposition space inside a stylus due to too many magnets is also prevented.

Refer to FIG. 1, the stylus 100 in this embodiment further includes a functional element 130. The functional 130 which is, for example, a charging coil, is disposed at a fourth position in the pen body 110. The first position where the magnet 122 is located, the second position where the end portion 1241 of the magnetic conductive structure 124 is located, and the fourth position where the functional element 130 is located are arranged along an axial direction A of the pen body 110. In this embodiment, the functional element 130 is located, for example, between the magnet 122 and the end portion 1241 of the magnetic conductive structure 124. In other embodiments, the functional element 130 may be located at the left side of the magnet 122 (from the angle of view in FIG. 1) or at the right side of the end portion 1241 of the magnetic conductive structure 124 (from the angle of view in FIG. 1); the disclosure is not limited thereto.

In continuation of the above, when the magnet 122 and the end portion 1241 of the magnetic conductive structure 124 respectively attract the magnet 52 and the magnet 54 of the electronic device 50, the functional element 130 corresponds to a functional element of the electronic device 50 (for example, a charging coil) to conduct charging or other electrical transmission. The single magnet 122 is disposed in the stylus 100 in this embodiment, which can prevent a decrease in the antenna efficiency of the charging coil in the stylus because of being affected by a magnetic field due to many magnets.

In this embodiment, the magnetic conductive structure 124 which is, for example, an iron sheet or other structure in the shape of a sheet which is made of a magnetic conductive material, is lighter and thinner than the magnet 122. Furthermore, the magnetic conductive structure 124 is made in the shape of a sheet, which makes the magnetic conductive structure 124 bent and processed easily and able to extend close to the side wall 112 of the pen body 110 through an extension section of the magnetic conductive structure 124. Specifically, the end portion 1241 of the magnetic conductive structure 124 includes a first extension section 1241a and a second extension section 1241b. The first extension section 1241a is vertically connected to the connection section 1243, and the second extension section 1241b is vertically connected to the first extension section 1241a and is attached closely to the side wall 112 of the pen body 110. In other embodiments, the magnetic conductive structure 124 may be in other appropriate shapes and extend in other appropriate ways; the disclosure is not limited thereto.

In the embodiment above, the stylus 100 is magnetically attracted to multiple points through the magnet 122 and the end portion 1241 of the magnetic conductive structure 124 which is magnetized. However, the disclosure is not limited thereto. In other embodiments, a plurality of end portions of the magnetic conductive structure 124 which is magnetized can be used to conduct multi-point magnetic attraction. The following details of the embodiments are illustrated with the accompanying drawings.

Figure 2:
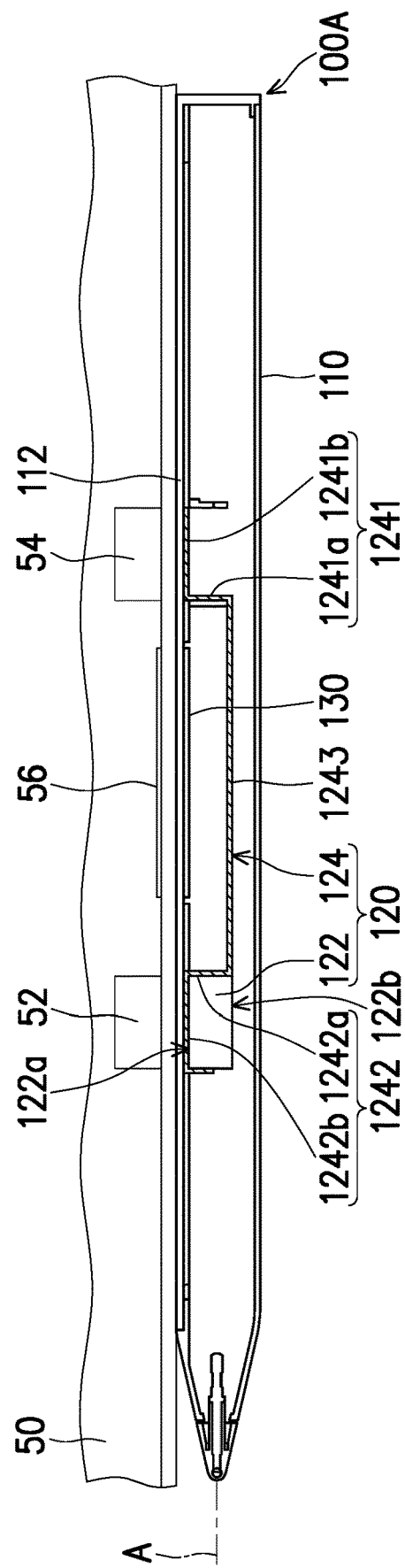
FIG. 2 is a schematic sectional view of a stylus in another embodiment of the disclosure.

FIG. 2 is a schematic sectional view of a stylus in another embodiment of the disclosure. The difference between the embodiment as shown is FIG. 2 and the embodiment as shown in FIG. 1 is that, in a stylus 100A in FIG. 2, an end portion 1242 of a magnetic conductive structure 124 includes a first extension section 1242a and a second extension section 1242b. The first extension section 1242a is vertically connected to the connection section 1243, and the second extension section 1242b is vertically connected to the first extension section 1242a and is attached closely to the side wall 112 of the pen body 110. The second extension section 1242b of the end portion 1242 is located between the magnet 122 and the side wall 112 of the pen body 110 and is attached closely to the side wall 112. As a result, the distance between the second position where the end portion 1241 of the magnetic conductive structure 124 is located and the side wall 112 and the distance between the third position where the end portion 1242 of the magnetic conductive structure 124 is located and the side wall 112 are respectively smaller than the distance between the first position where the magnet 122 is located and the side wall 112. In other words, the end portion 1241 and the end portion 1242 of the magnetic conductive structure 124 are located closer to the side wall 112. Accordingly, the magnetic attraction assembly 120 is adapted to magnetically attract the magnet 52 and the magnet 54 of the electronic device 50 through the two end portions 1241 and 1242 of the magnetic conductive structure 124. Refer to FIG. 2, the second position where the end portion 1241 of the magnetic conductive structure 124 is located, the third position where the end portion 1242 of the magnetic conductive structure 124 is located, and the fourth position where the functional element 130 is located are arranged along an axial direction A of the pen body 110.

In this embodiment, a magnetic pole 122a of the magnet 122 which faces the side wall 112 is, for example, a south pole, and is connected to the end portion 1242 of the magnetic conductive structure 124. The other magnetic pole 122b of the magnet 122 is, for example, a north pole. Therefore, the end portions 1241 and 1241 of the magnetic conductive structure 124 is magnetized into a south pole by the magnet 122. Correspondingly, in the electronic device 50, the magnet 52 faces the outside of the electronic device 50 with a north pole, and the magnet 54 faces the outside of the electronic device 50 with a north pole. Accordingly, the magnet 54 and the magnet 52 are able to, respectively, mutually magnetically attract the end portions 1241 and 1242 of the magnetic conductive structure 124. However, the disclosure is not limited thereto. The magnetic poles of the magnet 122 may be disposed opposite to the above-mentioned, and the magnetic poles of the magnetic conductive structure 124 and the magnet 52 and the magnet 54 are accordingly opposite to the above-mentioned. The rest of the deposition and functions of the stylus 100A is the same as or similar to the stylus 100.

FIG. 3 is a schematic sectional view of a stylus in still another embodiment of the disclosure. The difference between the embodiment as shown is FIG. 3 and the embodiment as shown in FIG. 2 is that, in a stylus 100B in FIG. 3, the magnetic conductive structure 124 is connected to the magnet 122 through the connection section 1243, and the connection section is located between the magnet 122 and a side wall 112 of a pen body 110. The distance between the second position where the end portion 1241 of the magnetic conductive structure 124 is located and the side wall 112 and the distance between the third position where the end portion 1242 of the magnetic conductive structure 124 is located and the side wall 112 are respectively smaller than the distance between the first position where the magnet 122 is located and the side wall 112. Accordingly, the magnetic attraction assembly 120 is adapted to magnetically attract the magnet 52 and the magnet 54 of the electronic device 50 through the two end portions 1241 and 1242 of the magnetic conductive structure 124.

In this embodiment, a magnetic pole 122a of the magnet 122 which faces the side wall 112 is, for example, a south pole, and is connected to the connection section 1243 of the magnetic conductive structure 124. The other magnetic pole 122b of the magnet 122 is, for example, a north pole. Therefore, the end portions 1241 and 1241 of the magnetic conductive structure 124 is magnetized into a south pole by the magnet 122. Correspondingly, in the electronic device 50, the magnet 52 faces the outside of the electronic device 50 with a north pole, and the magnet 54 faces the outside of the electronic device 50 with a north pole. Accordingly, the magnet 54 and the magnet 52 are able to, respectively, mutually magnetically attract the end portions 1241 and 1242 of the magnetic conductive structure 124. However, the disclosure is not limited thereto. The magnetic poles of the magnet 122 may be disposed opposite to the above-mentioned, and the magnetic poles of the magnetic conductive structure 124 and the magnets 52 and 54 are accordingly opposite to the above-mentioned. The rest of the deposition and functions of the stylus 100B is the same as or similar to the stylus 100A.

FIG. 4 is a schematic sectional view of a stylus in yet another embodiment of the disclosure. The difference between the embodiment as shown is FIG. 4 and the embodiment as shown in FIG. 3 is that, in a stylus 100C in FIG. 4, a magnet 122 is located between the connection section 1243 and the side wall 112 of the pen body 110.

In this embodiment, a magnetic pole 122a of the magnet 122 which faces the side wall 112 is, for example, a south pole, and the other magnetic pole 122b of the magnet 122 is, for example, a north pole and is connected to the connection section 1243 of the magnetic conductive structure 124. Therefore, the end portions 1241 and 1242 of the magnetic conductive structure 124 is magnetized into a north pole by the magnet 122. Correspondingly, in the electronic device 50, the magnet 52 faces the outside of the electronic device 50 with a south pole, and the magnet 54 faces the outside of the electronic device 50 with a south pole. Accordingly, the magnet 54 and the magnet 52 are able to, respectively, mutually magnetically attract the end portions 1241 and 1242 of the magnetic conductive structure 124. However, the disclosure is not limited thereto. The magnetic poles of the magnet 122 may be disposed opposite to the above-mentioned, and the magnetic poles of the magnetic conductive structure 124 and the magnets 52 and 54 are accordingly opposite to the above-mentioned. The rest of the deposition and functions of the stylus 100C is the same as or similar to the stylus 100B.

FIG. 5 is a schematic sectional view of a stylus in still another embodiment of the disclosure. The difference between the embodiment as shown is FIG. 5 and the embodiment as shown in FIG. 3 is that, in a stylus 100D in FIG. 5, a magnetic conductive structure 124 includes two magnetic conductive elements 124a and 124b which are separated from each other. The magnetic conductive elements 124a and 124b are respectively connected to two ends of a magnet 122 (the two ends are magnetic poles 122c and 122d) which are opposite to each other and located parallel to the direction of a side wall 112 (parallel to the axial direction A). The two end portions 1241 and 1242 of the magnetic conductive structure 124 are respectively located at the magnetic conductive elements 124a and 124b. The distance between the second position where the end portion 1241 of the magnetic conductive structure 124 is located and the side wall 112 and the distance between the third position where the end portion 1242 of the magnetic conductive structure 124 is located and the side wall 112 are respectively smaller than the distance between the first position where the magnet 122 is located and the side wall 112. Accordingly, the magnetic attraction assembly 120 is adapted to magnetically attract the magnet 52 and the magnet 54 of the electronic device 50 through the two end portions 1241 and 1242 of the magnetic conductive structure 124.

In this embodiment, the magnetic pole 122c of the connecting magnetic conductive elements 124a of the magnet 122 is, for example, a north pole, and the magnetic pole 122d of the connecting magnetic conductive elements 124b of the magnet 122 is, for examples, a south pole. Therefore, the end portion 1241 of the magnetic conductive elements 124a is magnetized into a north pole by the magnet 122, and the end portion 1242 of the magnetic conductive elements 124b is magnetized into a south pole by the magnet 122. Correspondingly, in the electronic device 50, the magnet 52 faces the outside of the electronic device 50 with a north pole, and the magnet 54 faces the outside of the electronic device 50 with a south pole. Accordingly, the magnet 54 and the magnet 52 are able to, respectively, mutually magnetically attract the end portions 1241 and 1242 of the magnetic conductive structure 124. However, the disclosure is not limited thereto. The magnetic poles of the magnet 122 may be disposed opposite to the above-mentioned, and the magnetic poles of the magnetic conductive structure 124 and the magnets 52 and 54 are accordingly opposite to the above-mentioned. The rest of the deposition and functions of the stylus 100D is the same as or similar to the stylus 100B.

FIG. 6 is a schematic sectional view of a stylus in yet another embodiment of the disclosure. The difference between the embodiment as shown is FIG. 6 and the embodiment as shown in FIG. 5 is that, in a stylus 100E in FIG. 6, the ends of the two magnetic conductive elements 124a and 124b which are connected to the magnet 122 are bent from down to up (from the angle of view in FIG. 6) instead of, as shown in FIG. 5, the ends of the two magnetic conductive elements 124a and 124b which are connected to the magnet 122 being bent from up to down (from the angle of view in FIG. 5). The rest of the deposition and functions of the stylus 100E is the same as or similar to the stylus 100D.

Figure 7:
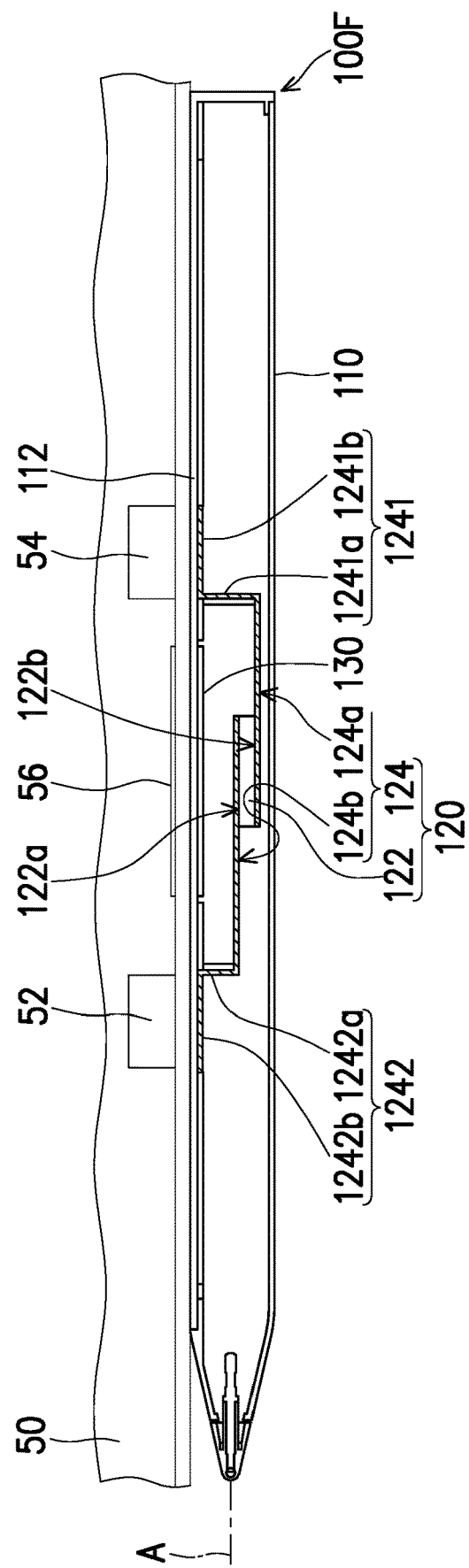
FIG. 7 is a schematic sectional view of a stylus in still another embodiment of the disclosure.

FIG. 7 is a schematic sectional view of a stylus in still another embodiment of the disclosure. The difference between the embodiment as shown is FIG. 7 and the embodiment as shown in FIG. 5 is that, in a stylus 100F in FIG. 7, the two magnetic conductive elements 124a and 124b are respectively connected to the magnet 122 at the two ends which are opposite to each other (the magnetic pole 122a and magnetic pole 122b) in the direction which is perpendicular to the side wall 112 (the direction which is perpendicular to the axial direction A) instead of, as shown in FIG. 5, the two magnetic conductive elements 124a and 124b being respectively connected to the magnet 122 at the two ends which are opposite to each other (the magnetic pole 122c and magnetic pole 122d) in the direction which is parallel to the side wall 112.

In this embodiment, the magnetic pole 122b of the connecting magnetic conductive elements 124a of the magnet 122 is, for example, a north pole, and the magnetic pole 122a of the connecting magnetic conductive elements 124b of the magnet 122 is, for example, a south pole. Therefore, the end portion 1241 of the magnetic conductive elements 124a is magnetized into a north pole by the magnet 122, and the end portion 1242 of the magnetic conductive elements 124b is magnetized into a south pole by the magnet 122. Correspondingly, in the electronic device 50, the magnet 52 faces the outside of the electronic device 50 with a north pole, and the magnet 54 faces the outside of the electronic device 50 with a south pole. Accordingly, the magnet 54 and the magnet 52 are able to, respectively, mutually magnetically attract the end portions 1241 and 1242 of the magnetic conductive structure 124. However, the disclosure is not limited thereto. The magnetic poles of the magnet 122 may be disposed opposite to the above-mentioned, and the magnetic poles of the magnetic conductive structure 124 and the magnets 52 and 54 are accordingly opposite to the above-mentioned. The rest of the deposition and functions of the stylus 100F is the same as or similar to the stylus 100D.

In light of the above, a magnet is disposed in a stylus in the disclosure, and the magnetic conductive structure which can be magnetized by the magnet is also disposed in the stylus. Also, an end portion of the magnetic conductive structure extends to a position which is different from the position of the magnet. Accordingly, the stylus can be positioned with a method of multi-point magnetic attraction through the single magnet and the end portion of the magnetic conductive structure which is magnetized or a plurality of end portions of a magnetic conductive structure which are magnetized. Therefore, a stylus in this disclosure, with a single magnet disposed, can magnetically attract an electronic device at a predetermined position and angle. In addition, an increase in a manufacturing cost and the weight of a stylus due to a plurality of magnets which are disposed is prevented. The occupation of the disposition space inside a stylus due to too many magnets is also prevented. Furthermore, a decrease in the antenna efficiency of a charging cord in the stylus due to being affected by a magnetic field is also prevented.

What is claimed is:

1. A stylus, comprising:
a pen body; and
a magnetic attraction assembly, comprising a magnet and a magnetic conductive structure, wherein the magnet is disposed at a first position of the pen body, the magnetic conductive structure is disposed in the pen body and is connected to the magnet to be magnetized by the magnet, and two end portions of the magnetic conductive structure are respectively located at a second position and a third position in the pen body,
the magnetic attraction assembly being adapted to magnetically attract an electronic device at two of the first position, the second position and the third position,
wherein the pen body comprises a side wall, the side wall is adapted to be attached closely to the electronic device through the magnetic attraction of the magnetic attraction assembly to the electronic device, and a distance between two of the first position, the second position and the third position and the side wall is smaller than a distance between the other of the first position, the second position and the third position and the side wall.

2. The stylus according to claim 1, wherein the magnetic conductive structure is connected to the magnet through one of the two end portions.

3. The stylus according to claim 2, wherein the magnet is located between one of the two end portions and the side wall, and the magnetic attraction assembly is adapted to magnetically attract the electronic device through the magnet and the other of the two end portions.

4. The stylus according to claim 2, wherein one of the two end portions is located between the magnet and the side wall, and the magnetic attraction assembly is adapted to magnetically attract the electronic device through the two end portions.

5. The stylus according to claim 1, wherein the magnetic conductive structure has a connection section, the connection section is connected between the two end portions, the magnetic conductive structure is connected to the magnet through the connection section, and the magnetic attraction assembly is adapted to magnetically attract the electronic device through the two end portions.

6. The stylus according to claim 5, wherein the magnet is located between the connection section and the side wall.

7. The stylus according to claim 5, wherein the connection section is located between the magnet and the side wall.

8. The stylus according to claim 1, wherein the magnetic conductive structure comprises two magnetic conductive elements which are separated from each other, each of the two magnetic conductive elements is connected to the magnet, the two end portions are located respectively at the two magnetic conductive elements, and the magnetic attraction assembly is adapted to magnetically attract the electronic device through the two end portions.

9. The stylus according to claim 8, wherein the two magnetic conductive elements are respectively connected to two opposite ends of the magnet, and the two ends of the magnet are opposite to each other in a direction parallel to the side wall or in a direction perpendicular to the side wall.

10. The stylus according to claim 1, further comprising a functional element, wherein the functional element is disposed in the pen body, and the functional element corresponds to another functional element of the electronic device when the magnetic attraction assembly attracts the electronic device.

11. A stylus, comprising:
a pen body; and
a magnetic attraction assembly, comprising a magnet and a magnetic conductive structure, wherein the magnet is disposed at a first position of the pen body, the magnetic conductive structure is disposed in the pen body and is connected to the magnet to be magnetized by the magnet, and two end portions of the magnetic conductive structure are respectively located at a second position and a third position in the pen body,
the magnetic attraction assembly being adapted to magnetically attract an electronic device at two of the first position, the second position and the third position,
wherein the magnetic conductive structure has a connection section, the connection section is connected between the two end portions, at least one of the two end portions comprises a first extension section and a second extension section, the first extension section is vertically connected to the connection section, and the second extension section is vertically connected to the first extension section and is attached to a side wall of the pen body.

12. A stylus, comprising:
a pen body; and
a magnetic attraction assembly, comprising a magnet and a magnetic conductive structure, wherein the magnet is disposed at a first position of the pen body, the magnetic conductive structure is disposed in the pen body and is connected to the magnet to be magnetized by the magnet, and two end portions of the magnetic conductive structure are respectively located at a second position and a third position in the pen body,
the magnetic attraction assembly being adapted to magnetically attract an electronic device at two of the first position, the second position and the third position,
wherein the stylus comprises a functional element, the functional element is disposed at a fourth position in the pen body, and two of the first position, the second position and the third position and the fourth position are arranged along an axial direction of the pen body.

13. A stylus, comprising:
a pen body; and
a magnetic attraction assembly, comprising a magnet and a magnetic conductive structure, wherein the magnet is disposed at a first position of the pen body, the magnetic conductive structure is disposed in the pen body and is connected to the magnet to be magnetized by the magnet, and two end portions of the magnetic conductive structure are respectively located at a second position and a third position in the pen body,
the magnetic attraction assembly being adapted to magnetically attract an electronic device at two of the first position, the second position and the third position,
wherein the stylus comprises a functional element, the functional element is disposed in the pen body, and the functional element corresponds to another functional element of the electronic device when the magnetic attraction assembly attracts the electronic device, and the two functional elements are charging coils.

* * * * *